(No Model.)
J. A. SHERMAN.
TOOL.
No. 298,421. Patented May 13, 1884.
Fig:1.
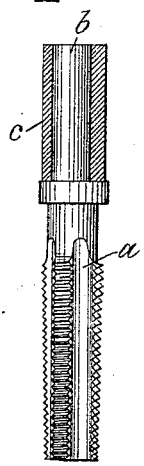
Fig:2.
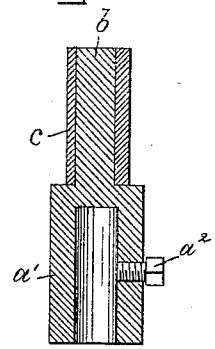
Fig:3.
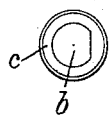
Witnesses.
Arthur Lippitlin.
John F. C. Prinkert.
Inventor.
John A. Sherman
by Crosby & Gregory attys.

UNITED STATES PATENT OFFICE.

JOHN A. SHERMAN, OF BOSTON, MASSACHUSETTS, ASSIGNOR OF ONE-HALF TO WILLIAM P. WARD, OF NEW YORK, N. Y.

TOOL.

SPECIFICATION forming part of Letters Patent No. 298,421, dated May 13, 1884.

Application filed November 26, 1883. (No model.)

*To all whom it may concern:*

Be it known that I, JOHN A. SHERMAN, of Boston, county of Suffolk, State of Massachusetts, have invented an Improvement in Tool-Shanks, of which the following description, in connection with the accompanying drawings, is a specification, like letters on the drawings representing like parts.

My invention consists in a novel construction of the shanks of tools that are to operate with a rotary movement—such, for instance, as taps, drills, reamers, and the like—the invention having for its object to prevent the breakage of the said tools in case an unusual resistance is brought against them, as by a flaw in the metal being operated upon or otherwise.

The invention consists, essentially, in providing the shank with a bushing or covering of soft material, preferably rawhide, which will be held by a suitable clamp or chuck, with sufficient friction to enable the tool to perform its work, but which will yield or slip in its chuck or clamp before sufficient strain is brought to bear to cause the breakage of the tool. The sleeve or covering is fixed upon the tool-shank, so as not to slip thereon, the slipping taking place between the outside of the bushing and inside of its holding chuck or clamp.

Figure 1 is a side elevation, partly in section, of a tap having a shank embodying this invention; Fig. 2, a longitudinal section of a tool clamp or socket having a shank embodying this invention, and Fig. 3 an end elevation of the tool-shank.

The tool $a$ has a stem or portion, $b$, to be connected with a chuck or holder by which the tool is operated. In tools as usually made the portion $b$ is squared or cylindrical and adapted to be held directly by a chuck or clamp; but with the hard surface of the tool metal it is difficult to gage the holding-power, as, when the clamping-surfaces are pressed together to hold the tool with sufficient power to do its work, it is quite possible that the force would be sufficient to break the tool if a great enough resistance were brought against it.

This danger of breakage is obviated by providing the shank with a covering or bushing, $c$, of soft material, preferably rawhide, which, when pressed upon by the surface of the inclosing chuck or clamp, will have a moderate amount of holding-power, sufficient to cause the tool to rotate with its chuck or clamp against any usual resistance—such as that of the metal being cut—but which, when an unusually great resistance is brought into action, will yield or slip in its clamp or chuck, thus preventing the tool from being broken.

In order that the holding-friction may be between the outer surface of the covering $c$ and the co-operating inner surface of the clamp or chuck, the said soft material or bushing $c$ is fixed upon the portion $b$ of the tool. As shown in this instance, the portion $b$ is flattened at one side, as best seen in Fig. 3, and the bushing $c$ fitted closely over it, the external surface of the bushing being cylindrical.

It is obvious that the bushing might be fixed upon the portion $b$ in any other manner, so as to have greater holding-power thereon than the frictional holding-power between its outer surface and the co-operating clamp or chuck.

As shown in Fig. 2, the bushing $c$ is applied to the stem $b$ of a socket, $a'$, in which any tool may be tightly fixed, as by the set-screw $a^2$.

I claim—

1. A tool-shank consisting of a stem forming a portion of, or adapted to be rigidly connected with, the tool, combined with a bushing of soft material fixed upon the said stem, substantially as and for the purpose described.

2. As an improved article of manufacture, a rotary-operating tool having its shank composed of a portion of the material of the tool, provided with a bushing of rawhide fixed thereon, substantially as described.

In testimony whereof I have signed my name to this specification in the presence of two subscribing witnesses.

JOHN A. SHERMAN.

Witnesses:
   JOS. P. LIVERMORE,
   W. H. SIGSTON.